July 3, 1945.  L. A. DELP  2,379,478
BEARING UNIT AND LUBRICATING MATERIAL THEREFOR
Filed Aug. 3, 1940
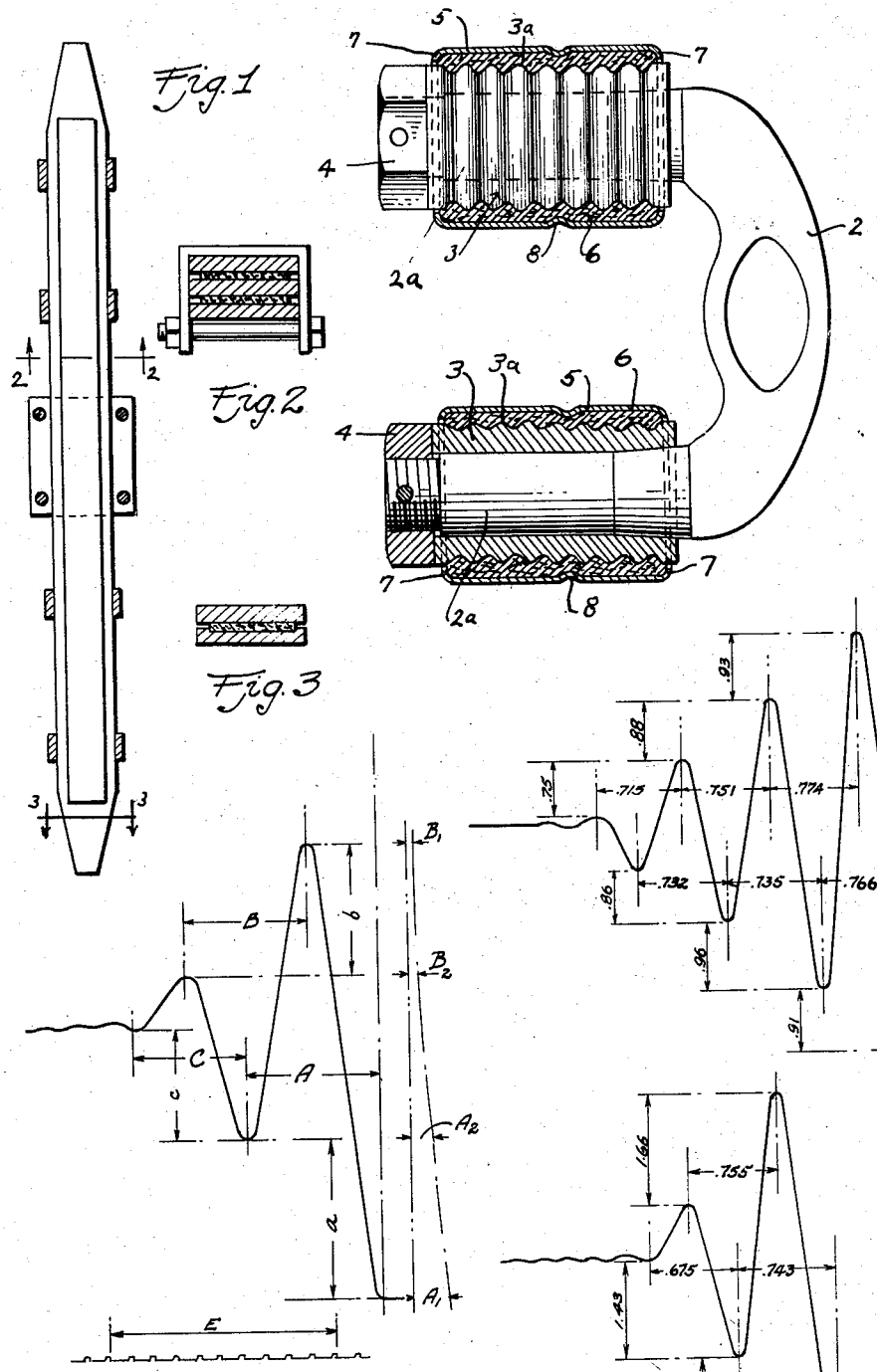
INVENTOR.
LEONARD A. DELP
BY
Barnes, Kisselle, Laughlin & Raisch
ATTORNEYS Patented July 3, 1945

2,379,478

UNITED STATES PATENT OFFICE 2,379,478

BEARING UNIT AND LUBRICATING MATERIAL THEREFOR

Leonard A. Delp, Ann Arbor, Mich.

Application August 3, 1940, Serial No. 350,344

7 Claims. (Cl. 308—242)

This invention relates to a bearing unit and lubricating material therefor. It has particularly to do with a bearing unit of the self-lubricating type.

The type of bearing under consideration may be located between an automobile leaf spring and support therefor. A well-known type of this bearing is composed of an inner cylindrical member and an outer tubular member between which a fabric material is compressed. In the past it has been the object of spring designers to provide this type of bearing with a relatively high frictional torque in order that a positive snubbing or damping action might result. With this arrangement the friction developed in the bearing was sufficient to resist the lateral end thrust forces to which this type of spring is always subjected. This type of bearing is suitable, however, only for stiff springs and when lighter and more flexible springs were adopted on passenger cars it was no longer possible to use the high frictional torque type of shackle bearing. The old type of bearing usually had a frictional torque of around 125 pound inches. However, with the new requirements for light springs it was found that frictional torque must be 40 pound inches or less.

With these new requirements, bearing material and lubricants used in the old shackle bearings were no longer suitable and it became necessary to obtain a lubricant which would be suitable for the new requirements.

It is an object of the present invention to provide a lubricant and bearing material which will provide a low frictional torque for the shackle bearings and still permit sufficient pressure to be used in the assembly of the springs that the shackle bearing will be a permanent arrangement. A further object of the invention is to provide a lubricant which has an extremely low break-away friction regardless of whether the spring on which it is used has a high or a low period. An additional object of the invention has to do with the design of a bearing structure which, when used with the new low friction lubricant and bearing material, will still provide the necessary resistance to end thrust.

Specifically, one species of the invention relates to a bearing material in which is included a component which reacts with the metallic parts of the bearing to condition the surface by greatly reducing the coefficient of friction. A fatty acid has been found satisfactory for this purpose although heretofore the use of acids has been studiously avoided as they were thought to be destructive.

Additional objects of the invention having to do with certain features of design and operation and with details of the compounding of the lubricant will be brought out in the following description and claims.

In the drawing:

Fig. 1 is a plan view of a leaf spring.

Figs. 2 and 3 are vertical sections through said spring on the lines 2—2 and 3—3 respectively, of Fig. 1.

Fig. 4 is an elevation, partly in section, of the type of spring shackle constructed in accordance with the present invention.

Figs. 5, 6 and 7 illustrate vibration curves for certain springs used in testing the results of the present invention.

In Fig. 1 is shown a standard leaf spring with sections as shown in Figs. 2 and 3. In Fig. 4 a shackle bolt 2 is shown in U-shape form with turned ends 2a. Tightly fitted on these turned ends are sleeves 3 having an outer surface provided with rolled beads 3a. These beads are preferably parallel and may be formed by a rolling or forming tool in the usual manner. Each end of the shackle may be turned down to receive nuts 4 which hold the sleeves 3 in position.

In the preferred method of assembly, the outer bearing or shell 5 is initially formed from a straight piece of tubing of greater diameter than that shown in Fig. 4. A strip of lubricant impregnated material 6 is wrapped annularly inside the length of tubing and the beaded portion of the shackle bolt is freely inserted in place. The outer shell or tube 5 is then subjected to sizing dies to bring the same down to the size shown in Fig. 4 and to compress materially the lubricant impregnated fibrous material 6. This material 6 is preferably a cotton wicking or other similar fibrous material. After this material is placed under compression, the ends 7 of the outer shell 5 are turned in to lock the outer bearing member in position and to hold the compressed fibrous material in place. Also an annular bead 8 is formed in the outer shell. Placing of the lubricant impregnated fabric material under relatively great pressure obviously causes the same to be pressed into the beads formed around the inner bearing member. This lubricant impregnated fibrous material, while placed under relatively great pressure, still remains expansible and, as any wear takes place after long continued use, expansion of the compressed material causes the same to hold the inner bearing member firmly in position. Other details of the spring structure are fully described in Patent No. 2,069,781 which is directed to a similar structure.

In other words, the present invention contemplates a controlled frictional torque independent of break-away or static friction. The pressure at which the compressible material is assembled controls the frictional torque or period. The static or break-away friction is independently controlled by the lubricating compound with which the compressible material is impregnated as hereinafter described.

In order that the lubricant impregnated fibrous material 6 may be permanently arranged in the bearing, it is essential that considerable pressure be exerted upon it. Consequently, due to the requirement that the spring have a low period, it has been necessary to seek a lubricant and material which would provide the spring with a relatively low breakaway or static friction and low dynamic sliding frictional torque. It is also necessary to have a bearing material that has a long life and will provide a constant torque after long period of service. A further requirement is a bearing which is free from noise of any type regardless of the length of use.

None of the previous lubricants used in shackle bearings has been found to be suitable and considerable research has been necessary to develop a suitable lubricant and fabric to take the lubricant. A lubricant compound which has been discovered as satisfactory for impregnating a cotton wick is a stearic acid compound which, in percent by weight, is made up of 38.94 per cent stearate, 58.60 per cent engine oil, and 2.46 per cent lamp black. The stearate is preferably formed of 92 per cent stearic acid, 4 per cent calcium oxide, and 4 per cent carnauba wax. The engine should have preferably a minimum of 35 per cent naphthenic base and the lamp black should be of a very good grade. The material is mixed by first forming a stearate and mixing the oil with it, and then the lamp black. It is preferably mixed while the ingredients are warm.

Many bearings are now being formed with some rubber parts and, consequently, a lubricant is desirable which will perform satisfactorily in the presence of rubber without causing deterioration of the same.

It is common knowledge that castor oil can be used in the presence of rubber without undue attack. Another substance which may be mixed with castor oil is ricinoleic acid. This acid is obtained from a glyceride that is present in castor oil. Its preparation is similar to that of preparing stearic acid from beef tallow. Ricinoleic acid is a liquid at room temperature and like castor oil, does not change viscosity rapidly with a change in temperature. It has been found that ricinoleic acid and castor oil may be mixed in all proportions to give a liquid suitable for saturating a fabric and which will not exert any deleterious effect on rubber. Following the theory that the presence of salt in the acid does not inhibit the action of the acid on a material such as steel, it has also been found desirable to include calcium ricinoleate in the lubricating mixture. This soap, being a solid and without a definite melting point, can not be used in all proportions with either ricinoleic acid or castor oil. Combinations of the three components up to 80 per cent of calcium ricinoleate have been used but the higher percentage of the calcium soap produce a very viscous mass and makes impregnation of the fabric very difficult.

The most satisfactory combination with regard to the properties of the final bearing, lies in the range of 25 to 40 per cent ricinoleic acid, 20 to 40 per cent castor oil, and 30 to 50 per cent calcium ricinoleate. The addition of 5 per cent of carnauba wax and 2½ per cent lamp black appears to be quite beneficial in reducing the coefficient of the lubricant.

A third type of lubricant which has been found satisfactory is a combination of oil, a fatty acid such as stearic acid, and a metallic soap such as calcium stearate. It is believed that in such a combination the mineral oil acts as a carrier for the stearic acid which has a slight chemical action upon the metal stud of the bearing. This may be a slight corrosive action but at any rate there seems to be a mild affinity between the iron stearate that is formed and the metal stud. This gives a monomolecular film of the iron stearate about the metal which causes a marked reduction in the coefficient of friction. The free stearic acid aids the fabric in retaining its resiliency thereby insuring a bearing of more uniform torque during its life period. If a high grade of mineral oil is used, that is, an oil free from oxidizable material, it is unnecessary to use lamp black as a surface conditioner for the fabric, although if a certain quantity of graphite is added, it seems to reduce the friction. A most satisfactory combination with regard to the properties of the final bearing of the above materials lies in a range of 48 to 67 per cent mineral oil, 12 to 45 per cent stearic acid, and 3 to 23 per cent calcium stearate. Although satisfactory combinations have been formed within the following ranges:

|  | Percent |
|---|---|
| Mineral oil | 30 to 95 |
| Stearic acid | 2 to 70 |
| Calcium stearate | 1 to 38 |

More specifically, the following formulas have proved satisfactory:

|  | Pounds | Per cent |  | Pounds and per cent |
|---|---|---|---|---|
| A. Junior red oil | 61 | 58.65 | B. Stan oil | 55 |
| Calcium Stearate | 17.5 | 16.85 |  | 10 |
| Stearic acid | 21.5 | 20.66 |  | 35 |
| Lamp black | 1.5 | 1.44 |  | 0 |
| Wax (carnauba) | 2.5 | 2.40 |  | 0 |
|  | 104 | 100.00 |  | 100 |

As previously stated there is a reaction between the metal surfaces of the bearing and the acid in the compound, an effect previously avoided by designers. It has been found that a soft steel may be satisfactorily used. Also the compressed fabric acts as a dust shield for the bearing surfaces; the compounds used, being not soluble in water at normal temperatures, will not wash out. It will be noted that in formula B no graphite is used. This is due to the high grade of oil used. While graphite is advantageously used with a lower grade of oil, it detracts from the control of the friction since it has an abrasive action on the metal parts. Other acids and soaps may be used. The acid plus an oxide forms the soap, of course. For example, sodium or potassium hydroxides or zinc oxide can be combined with stearic or oleic acids to get a stearate or oleate.

After the mixing, the cotton wicking is impregnated with the lubricant either by soaking or spraying or other methods and it is then applied to the springs as previously described. The lubricant is preferably applied when heated. Tests have been made for purposes of comparing the spring shackle provided with the new lubricant with springs having the old type of lubricant and higher frictional torque values. A regular production automobile leaf spring was used in the test, the shackles being changed in each case. In order to test the period of the springs with the various bearings and the number of vibrations, dynamic load tests were made by loading the springs and recording the vibrations when the load is released. The details of the test will not be described here but certain results are illustrated in the curves of Figs. 5, 6 and 7. The horizontal portion or axis of the curve represents time and the vertical portion represents amplitude of vibration. In order to set up the equation for determining the results, Fig. 5 has been lettered as shown. Due to the fact that the arm for the recording apparatus is moved in an arc rather than a perpendicular line, the charts do not show a true space-time record of the amplitude of vibration. The distances A, B, etc., must necessarily be corrected for the swing of the recording lever. Consequently, the corrected values are $A - A_1 + A_2$ for values above the neutral axis, and $B - B_1 + B_2$ for values below the neutral axis. These corrected measures of the period are divided by the time factor. The time factor is obtained by taking the distance E on the time record, representing a certain number of seconds, and dividing it by that number. The time record indicates fifths of a second. The actual period of vibrations for that portion of the space-time record for which the dimensions were taken, is:

$$t_A = \frac{(A - A_1 + A_2)n}{E}$$

where $n$ is the number of seconds. Likewise:

$$t_B = \frac{(B - B_1 + B_2)n}{E}$$

Fig. 6 illustrates the results of a dynamic test on a leaf spring equipped with a low friction bearing provided with the lubricant as above described. The horizontal numbers on the figure represent the period and seconds per vibration. These periods, as shown on the figure, are values which have been corrected for the swing of the recording lever as above described. It will be noted that in Fig. 6 there are 6 major vibrations before the spring settles down to the minor vibration.

Fig. 7 illustrates a similar curve for a spring of the old type having considerably higher torsional resistance. It will be noted that in this case there are only 3 major vibrations before the spring settles down to a series of minor vibrations. The results of the test show that the torsional resistance of a spring eye bearing has no appreciable effect on the period of vibration of production springs during the major vibration of the spring. Secondly, the torsional resistance of the spring eye bearing has a marked effect on the damping. In other words, bearings with low frictional resistance give little damping effect and those having high frictional torque or resistance give considerable damping. The results of the tests made prove conclusively that the bearing utilizing the special lubricant above described, provided a spring which had the desirable characteristic of a much greater number of major vibrations before it came to rest.

It has also been found that the lubricant, as above disclosed, is extremely desirable in bearings that have a high frictional torque due to increased pressure in their manufacture since the new lubricant provides extremely low break-away friction and, consequently, much smoother action.

As previously stated, when the frictional resistance of a bearing is cut down, the end thrust problem is accentuated. This problem has been met in the present case by providing the spring bearing as shown, with the rolled beads on the inner member and at least one annular bead 8 extending inwardly in the shell 5.

What I claim is:

1. A bearing material adapted to be compressed between two relatively movable parts of an oscillatable bearing comprising a fabric material impregnated with a lubricant composed substantially of 25 to 40 per cent by weight ricinoleic acid, 20 to 40 per cent by weight castor oil and 30 to 50 per cent by weight calcium ricinoleate.

2. A bearing material adapted to be compressed between two relatively movable parts of an oscillatable bearing comprising a fabric material impregnated with a lubricant composed substantially of 48 to 67 per cent by weight mineral oil, 12 to 45 per cent by weight of stearic acid, and 3 to 23 per cent by weight calcium stearate, said stearic acid having an affinity for the surface of one of the movable parts to react therewith to form a low friction coating thereon.

3. A bearing material adapted to be compressed between two relatively movable parts, one of which is steel, of an oscillatable bearing comprising a fabric material impregnated with a lubricant composed substantially of 48 to 67 per cent by weight of mineral oil, 12 to 45 per cent by weight of stearic acid, and 3 to 23 per cent by weight of calcium stearate, said stearic acid having an affinity for the steel surface in a manner to react therewith to form a low friction coating.

4. A bearing material adapted to be compressed between two relatively movable parts, one of which is steel, of an oscillatable bearing comprising a fabric material impregnated with a lubricant composed substantially of 55 per cent by weight of mineral oil, 35 per cent by weight of stearic acid, and 10 percent by weight of calcium stearate, said stearic acid having an affinity for the steel surface in a manner to react therewith to form a low friction coating.

5. A bearing material adapted to be compressed between two relatively movable parts, one of which is steel, of an oscillatable bearing comprising a fabric material impregnated with a lubricant composed substantially of 58.65 per cent by weight of mineral oil, 20.66 per cent by weight of stearic acid, 16.85 per cent by weight of calcium stearate, 1.44 per cent by weight of lamp black, and 2.5 per cent by weight of wax.

6. In a lubricated joint, a fabric material serving as a carrier for mineral oil, and free stearic acid and calcium stearate carried in said mineral oil to serve as a surface conditioner for steel forming one friction surface of said joint.

7. In a lubricated joint, relatively movable parts having steel surfaces, and a fabric material impregnated with a fatty acid located between said surfaces.

LEONARD A. DELP.